United States Patent Office 3,740,263
Patented June 19, 1973

3,740,263
PROCESS FOR THE PREPARATION OF
MANUFACTURED ARTICLES
Rajindar K. Kochhar, Overland Park, Joseph W. Jones, Jr., Leawood, and Raymond M. Henry, Overland Park, Kans., assignors to Gulf Research & Development Company, Pittsburgh, Pa.
No Drawing. Continuation of abandoned application Ser. No. 740,979, June 28, 1968. This application Aug. 12, 1971, Ser. No. 171,374
Int. Cl. C03c 25/02
U.S. Cl. 117—126 GR
2 Claims

ABSTRACT OF THE DISCLOSURE

Polymer-coated glass fibers bearing a coating of an ethylene-acrylic acid copolymer are prepared by passing heated glass fibers through a freshly-prepared aqueous dispersion of an ammonium salt of an ethylene-acrylic acid copolymer. The coated glass fibers thus prepared are useful as a reinforcing agent for thermoplastic molding resins.

---

This application is a continuation of application Ser. No. 740,979 filed June 28, 1968, now abandoned.

CROSS-REFERENCES TO RELATED APPLICATIONS

Copending application Ser. No. 131,108, filed Aug. 14, 1961 by Jack Hurst and Harry D. Anspon, now Pat. No. 3,486,929, issued Dec. 30, 1969, describes the preparation of aqueous dispersions of water-insoluble, self-emulsifiable ethylene polymers containing pendent metallic salt groups. As described therein, water-insoluble, self-emulsifiable ethylene polymers containing pendent metallic salt groups are prepared by the hydrolysis in an aqueous medium of the acrylate groups of the thermoplastic ethylene-alkyl acrylate interpolymer employing elevated temperatures, a metallic base, and, optionally, a nitrogenous base to produce a stable aqueous dispersion of the ethylene polymer. In addition to the pendent metallic salt groups, the product ethylene polymer can also contain pendent carboxylic groups, pendent ester groups, and where a nitrogenous base is also employed in the hydrolysis process, pendent amide groups. Reference is made to U.S. 3,486,929 for a complete description of methods of preparing such aqueous polymeric dispersions.

U.S. 3,511,799 describes the preparation of aqueous dispersions of water-insoluble, self-emulsifiable ethylene polymer containing pendent ammonium salt groups by passing the aqueous dispersions of U.S. 3,486,929 through an ion exchange zone and recovering therefrom stable aqueous dispersion of ethylene polymers containing pendent ammonium salt groups. As therein described aqueous dispersions of water-insoluble, self-emulsifiable ethylene polymers containing pendent metallic salt groups are contacted with an ion exchange medium comprising a strongly acidic cation exchange resin charged with ammonium ions. The ammonium ions are exchanged for the metallic cations of the aqueous dispersion. A stable aqueous dispersion substantially free of metallic cations and containing an ethylene polymer having pendent ammonium salt groups is recovered from the ion exchange zone. Reference is made to U.S. 3,511,799 for a complete description of the method of preparing aqueous dispersions of ethylene polymers containing pendent ammonium salt groups which are applicable in practicing the process of the hereinafter-described invention.

BACKGROUND OF THE INVENTION

This invention relates to an improved process for the preparation of certain coated articles of manufacture and laminated structures in which the coating or the adhesive layer of the laminated structure consists of an ethylene polymer containing pendent carboxylic groups and, optionally, amide and/or ester groups.

It has been observed that ethylene polymers containing pendent carboxylic groups can effectively be employed to provide coatings for the following substrates, said substrates being either fibrous or non-fibrous:

(1) Cellulose, particularly wood, paper and cellophane,
(2) Cellulose esters, particularly cellulose acetate, cellulose nitrate, cellulose propionate, and cellulose acetate-butyrate,
(3) Cellulose ethers, particularly methyl cellulose and carboxylatemethyl cellulose,
(4) Metals, particularly aluminum, steel, zinc, copper, brass, and bronze,
(5) Thermoplastic polyesters, particularly polyethylene terephthalate,
(6) Thermoplastic polycarbonates, particularly the currently commercially available materials prepared by reacting phosgene with bisphenols,
(7) Polyurethanes, particularly those prepared by reacting polyesters or polyethers with polyisocyanates such as toluene di-isocyanate,
(8) Thermoplastic formaldehyde homopolymers and copolymers, particularly the currently commercially available materials such as Delrin and Celcon,
(9) Thermoplastic polyamides, particularly homopolymers and copolymers of caprolactam and the condensates of hexamethylene diamine and adipic acid,
(10) Polyvinyl alcohol,
(11) Thermoplastic addition polymers having polymerized therein at least 25 mol. percent of at least one monomer selected from the group consisting of:

(a) 2–4 carbon atom monoolefins, e.g., ethylene, propylene, and isobutylene,
(b) Vinyl halides, e.g., vinyl chloride,
(c) Vinylidene halides, e.g., vinylidene chloride,
(d) Styrene and substituted styrenes, e.g., styrene itself, alpha-methylstyrene, ring-alkyl substituted styrenes such as vinyl toluene, and ring-halo substituted styrenes such as 2,5-dichlorostyrene, and
(e) Esters of acrylic and alpha-alkyl subsituted acrylic acids, e.g., methyl acrylate, lauryl acrylate, methyl methacrylate, butyl methacrylate, and stearyl acrylate, and

(12) Glass.

The coatings laid down on the above-named substrates are glossy, tough, flexible and heat sealable, either to themselves or to any of the substrates above noted herewith. The coatings also have excellent resistance to mineral and vegetable oils.

Papers coated with the ethylene polymers have excellent moisture-vapor-transmission values. The coated papers have excellent resistance to mineral and vegetable oils and the combination of low moisture-vapor-transmission values and good oil resistance makes the paper particularly useful in the packaging arts.

Polyolefins, and particularly polyethylene, when coated with ethylene polymers containing pendent carboxylic groups have improved aesthetic appearance inasmuch as the coatings have excellent gloss and the coated polyolefins possess excellent oil resistance and good printability. For these reasons such coated polyolefin films are excellent materials for use in packaging fatty foods. Nylon film when coated with ethylene polymers containing pendent carboxylic groups have shown excellent properties in packaging meat products.

The laminates of the invention comprise two or more laminae which are bonded together with an ethylene polymer containing pendent carboxylic groups. The laminae can be fabricated from any of the materials employed as a substrate in the coated articles previously described.

Accordingly, an object of our invention is to provide an improved process for the preparation of coated substrates employing as a coating composition a water-insoluble, self-emulsifiable ethylene polymer containing pendent carboxylic groups.

Another object of our invention is to provide a process for applying a coating of an ethylene polymer containing pendent ammonium salt groups to a variety of substrates.

Yet another object of our invention is to provide an improved process for the preparation of laminate structures wherein the bonding agent comprises an ethylene polymer containing pendent carboxylic groups.

Other objects, advantages and features of our invention will be readily apparent to those skilled in the art from the following description and appendent claims.

SUMMARY OF THE INVENTION

By the invention coated articles of manufacture are prepared by contacting an appropriate substrate with an aqueous dispersion of a water-insoluble, self-emulsifiable ethylene polymer containing pendent ammonium salt groups and the resultant coated substrate thereafter heated to an elevated temperature, thereby converting the ammonium salt gorups to acid groups. Optionally, the self-emulsifiable ethylene polymer can also contain pendent ester and amide groups.

In a second embodiment of the invention, laminate structures are prepared by contacting a surface of a lamina with an aqueous dispersion of a water-insoluble, self-emulsifiable ethylene polymer containing pendent ammonium salt groups, the resultant coated lamina contacted with a second lamina and the product laminated structure thereafter heated to an elevated temperature.

DESCRIPTION OF THE INVENTION

As heretofore noted aqueous dispersions of water-insoluble, self-emulsifiable ethylene polymers can be prepared by the hydrolysis of a thermoplastic ethylene-alkyl polymer in an aqueous medium utilizing a metallic base and, optionally, a nitrogenous base such as ammonia to hydrolyze a portion or all of the acrylate groups to the carboxylate salt and, optionally, acid and/or amide form. The ethylene-alkyl acrylate polymer which can be hydrolyzed to provide such aqueous dispersions can be those polymers described by George E. Ham, Harry D. Anspon and William H. Byler in U.S. Pat. 3,350,372 issued Oct. 31, 1967. The ethylene-alkyl acrylate polymer so prepared and so hydrolyzed by the process described in copending application Ser. No. 131,108 can then be passed through an ion exchange zone containing a strongly acidic cation exchange resin charged with ammonium ions. The ammonium ions are exchanged for metallic cations of the aqueous dispersions and a stable aqueous dispersion of water-insoluble, self-emulsifiable ethylene polymer containing pendent ammonium salt groups is recovered from the ion exchange zone.

Those ethylene polymers which are considered to be particularly applicable in preparation of the coated substrates and laminate structures of our invention are those ethylene-alkyl acrylate polymers wherein the alkyl acrylate concentration is in the range of about 0.01 to about 0.5 (preferably 0.025 to about 0.25 mol) of acrylate groups per mol of contained ethylene groups. The water-insoluble, but self-emulsifiable ethylene-alkyl acrylate polymers are selected from the group consisting of:

(1) Polymers containing 67–99 (preferably 87–95.2) mol percent of units (a) and, correspondingly, 33–1 (preferably 13.0–4.8) mol percent of units (b), (2) Polymers containing 67–99 (preferably 87–95.2) mol percent of units (a) and, correspondingly, 33–1 (preferably 13.0–4.8) mol percent of a mixture of units (b) and (c), (3) Polymers containing 67–99 (preferably 87–95.2) mol percent of units (a), and, correspondingly, 33–1 (preferably 13.0–4.8) mol percent of a mixture of units (b), (c) and (d), (4) Polymers containing 67–99 (preferably 87–95.2) mol percent of units (a) and, correspondingly, 33–1 (preferably 13.0–4.8) mol percent of a mixture of units (b), (c), (d) and (e), (5) Polymers containing 67–99 (preferably 87–95.2) mol percent of units (a) and, correspondingly, 33–1 (preferably 13.0–4.8) mol percent of a mixture of units (b) and (d), (6) Polymers containing 67–99 (preferably 87–95.2) mol percent of units (a) and, correspondingly, 33–1 (preferably 13.0–4.8) mol percent of a mixture of units (b) and (e), (7) Polymers containing 67–99 (preferably 87–95.2) mol percent of units (a) and, correspondingly, 33–1 (preferably 13.0–4.8) mol percent of a mixture of units (b), (c) and (e), (8) Polymers containing 67–99 (preferably 87–95.2) mol percent of units (a) and, correspondingly, 33–1 (preferably 13.0–4.8) mol percent of a mixture of units (b), (d) and (e), and (9) Mixtures of (1), (2), (3), (4), (5), (6), (7) and (8), said units (a) having the structure

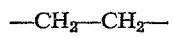

said units (b) having the structure

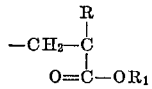

said units (c) having the structure

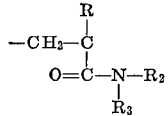

said units (d) having the structure

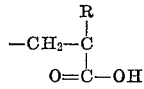

said units (e) having the structure

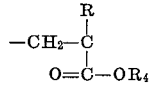

where R is selected from the group consisting of hydrogen and methyl, $R_1$ is the ammonium ion, $R_2$ and $R_3$ are independently selected from the group consisting of hydrogen, methyl, ethyl, propyl, butyl, hydroxyethyl, morpholine and heterocyclic groups containing up to 22 carbon atoms and $R_4$ is selected from allyl and alkyl groups containing up to 22 carbon atoms.

"Water-insoluble" as used herein refers to the inability of the fused solid ethylene polymer to become dissolved in water as measured, for example, by preparing a one-half mil cast film of the product polymer, placing a 10×10 centimeter sample in one liter of water maintained at a temperature of 30° C. for a period of 24 hours, removing the film from the water, drying the film to a constant weight at 120° C. and determining that the weight loss in the film when compared to the weight of the original film sample shall be less than 10 weight percent. "Self-emulsifiable" as used herein refers to that property of the polymer whereby one gram of the polymer in particulate form can be readily dispersed in 100 ml. of water in a stirred metal autoclave maintained at a temperature in the range of 180 to 300° C. to provide, in the absence of an emulsifying agent, a shelf-stable dispersion wherein the average particle size is two microns or less.

In a specific embodiment of the invention, the aqueous dispersion of the ethylene polymer of U.S. 3,486,929 containing prendent metallic salt groups is intimately contacted with the ion exchange resin of U.S. 3,511,799 to obtain an aqueous dispersion of an ethylene polymer containing pendent ammonium salt groups and, optionally, amide, and/or ester groups. Glass fibers as they are withdrawn from the spinerette are contacted with the aqueous dispersion of the ethylene polymer. The hot glass fibers cause decomposition of the ammonium salt groups to the acid form and the glass fibers obtain a coating of an ethylene polymer containing pendent acid groups. Subsequently, if desired, the coated glass fibers can be chopped into pellet-size particles and employed to reinforce polymeric resins as hereinafter described.

For reasons not completely understood, the novel method of obtaining glass coated with an ethylene polymer containing pendent acid groups as described above results in effecting an adhesive bond between the glass and the coating substantially superior to other methods of coating glass with an ethylene polymer containing pendent acid groups.

The ethylene polymer coated glass particles prepared as described above can be employed as reinforcing materials for polymeric resins such as nylon. Conventionally, the blending of glass fibers with polymeric resins such as nylon is difficult to effect in that static development in cut glass fiber causes the glass to fluff up. Additionally, the high viscosity of the molten nylon makes it extremely difficult to wet the glass fibers.

By coating the glass fibers as described above, the coated glass particles can be blended with nylon in a conventional extruder without static development normally present in conventional blending operations. The ethylene polymer coating also acts as a common binder for the nylon and glass, thereby obtaining a nylon composition having substantially superior strength properties when compared with conventional glass-filled nylon compositions.

The ethylene polymer coating acts as a lubricant on the cut glass fiber so as to reduce blending machine wear and tear, and by increasing the bulk density of the glass fibers, substantially easier dry mixing of the glass fibers and nylon can be effected.

The laminated structures of the invention can be prepared by laying down an aqueous dispersion of the ethylene polymer containing pendent ammonium salt groups on the substrate surface and evaporating the water therefrom. The coating can be heated during or subsequent to the drying step so as to convert the pendent ammonium salt groups to the acid form. A second lamina can then be placed adjacent to the coated surface of the substrate and the laminated structure heated under pressure.

Alternatively, the aqueous dispersion of the ethylene polymer containing pendent ammonium salt groups can be laid down as a coating on one lamina, the water removed therefrom and a second lamina subsequently placed against the coated surface of the first lamina. The prepared laminated structure is then heated under at least light pressure.

The laminates thus prepared are firmly bonded together and ordinarily cannot be separated without destroying at least one of the laminae. By the invention as described above, laminated structures comprising a glass cloth lamina and a nylon film lamina can be prepared, for example, with the resultant laminated structure having high flexural strength.

The following examples are presented to illustrate the objects and advantages of the invention. It is not intended, however, that the invention should be limited to the specific embodiments presented therein.

Example I

In this example an ethylene-methyl acrylate copolymer containing 20.0 weight percent methyl acrylate is hydrolyzed to the potassium salt form by the process described in application Ser. No. 131,108 and the resultant aqueous dispersion of the ethylene polymer contacted with an ion exchange resin as described in U.S. 3,511,799 to obtain an aqueous dispersion of an ethylene polymer having pendent ammonium salt groups. The aqueous ethylene polymer dispersion is contacted with glass fibers issuing from a spinnerette, the glass fibers becoming coated with the ethylene polymer. The pendent ammonium salt groups decompose upon contact with the hot glass fibers, resulting in the preparation of glass fibers containing a coating of an ethylene polymer having pendent acid groups. The coated fibers are then chopped into short fibers, one-quarter inch in length, with each chopped fiber containing 1.9 weight percent of the ethylene polymer.

The coated glass fibers as prepared above are blended in a conventional twin screw extruder with nylon 6 to prepare a blended composition containing 25.1 weight percent coated glass fibers. The tensile and flexural strengths of the prepared composition as determined by injection molded specimens of the blended composition are 15,470 p.s.i. and 18,072 p.s.i., respectively. The tensile and flexural strengths are determined by ASTM D–638 and D–790, respectively.

Example II

In this example uncoated glass fibers, one-quarter inch in length, are blended with the nylon 6 of Example I in the twin-screw extruder of Example I to obtain a blended composition containing 32.4 weight percent glass. The tensile and flexural strengths of injection molded specimens of the blended compositions as determined by the test methods of Evample I are 12,471 and 15,866 p.s.i., respectively.

A comparison of the results obtained in Examples I and II clearly demonstrates the effectiveness of the ethylene polymer coating on the glass fibers to substantially increase tensile and flexural strengths of the blended compositions.

Example III

In this example the effectiveness of the invention to obtain a nylon 6,6-glass composition having high tensile and flexural strengths is demonstrated. The coated glass fibers of Example I are blended with nylon 6,6 to obtain a blended composition containing 31.7 weight percent glass. Injection molded prepared specimens of the blended compositions have tensile and flexural strengths of 17,432 p.s.i. and 25,977 p.s.i. as determined by the test methods of Example I.

Example IV

In this example the effectiveness of the invention to obtain a nylon 6,10-glass composition having high tensile and flexural strength is demonstrated. The ethylene coated glass fibers of Example I are blended with a nylon 6,10 composition to obtain a blended composition containing 29.1 weight percent glass. The tensile and flexural strengths of injection molded prepared specimen of the blended composition are 16,468 p.s.i. and 24,587 p.s.i., respectively, as determined by the test methods of Example I.

Example V

Uncoated glass cloth is treated by immersing it in a diluted aqueous dispersion of the ethylene polymer of Example I and drying it in an oven at 110° C. for three minutes. The pendent amonium salt groups of the polymer decompose upon heating, resulting in the preparation of a glass cloth having a coating of an ethylene polymer containing pendent acid groups. Six 5" x 7" pieces of the glass cloth so treated were interlayed with a sufficient number of 5" x 7" pieces of three mil thick nylon 6 film to prepare a laminated structure wherein 60 percent of the total weight of the structure is glass and 40 percent is nylon 6. The laminated structure is then pressed in a heated hydraulic press employing a temperature of 475° F. and a pressure of 200 p.s.i.

The resulting laminated structure is 0.07 inch thick and the flexural strength of the laminated structure as determined according to the test methods of Example I is 44,591 p.s.i. (dry) and 26,731 p.s.i. (after immersion in water for 24 hours).

Example VI

Six 5" x 7" pieces of uncoated glass cloth are interlayed with a sufficient number of 5" x 7" pieces of 3 mil thick nylon 6 film so that 60 percent by weight of the laminated structure is glass and 40 percent by weight is nylon 6. The laminated structure is then pressed as in Example V at 475° F. for 5 minutes utilizing a pressure of 200 p.s.i. The resulting laminate is 0.07 inch thick and has flexural strengths according to the test method of Example I of 25,440 p.s.i. (dry) and 13,740 p.s.i. (after immersion in water for 24 hours).

A comparison of the results obtained in Examples V and VI clearly demonstrates the effectiveness of the ethylene polymer coating to subtsantially increase the flexural strength of the composite structure.

From the foregoing it is readily apparent that in the preparation of the laminated structures no criticality is attached to the shape of the individual laminae. As seen above, for example, the laminated structure can take the form of chopped-glass fibers dispersed in the resin. Laminated structures can also be formed from films or by dispersing coated spheroids in a resin.

Although the invention has been described with reference to specific embodiments, materials, and details, various modifications and changes will be apparent to those skilled in the art. Accordingly, the invention is not to be limited by such embodiments, materials, and details except as set forth in the appended claims.

We claim:

1. A process which comprises passing heated glass fibers through a freshly prepared aqueous dispersion of an ethylene polymer containing pendent ammonium salt groups, said aqueous dispersion of said ethylene polymer having been prepared by passing an aqueous dispersion of a water-insoluble, self-emulsifiable ethylene polymer containing pendent metallic carboxylate groups through an ion exchange zone containing a strongly acidic cation exchange resin charged with ammonium ions, and recovering from said aqueous dispersion glass fibers coated with an ethylene polymer wherein said pendent ammonium salt groups have been converted to acid groups.

2. A process which comprises passing heated glass fibers through a freshly prepared aqueous dispersion of a water-insoluble, self-emulsifiable polymer consisting of:
   (1) polymers containing 67–99 mol. percent of units (a) and, correspondingly, 33–1 mol. percent of units (b),
   (2) polymers containing 67–99 mol. percent of units (a) and, correspondingly, 33–1 mol. percent of a mixture of units (b) and (c),
   (3) polymer containing 67–99 mol. percent of units (a) and, correspondingly, 33–1 mol. percent of a mixture of units (b), (c) and (d),
   (4) polymers containing 67–99 mol. percent of units (a) and, correspondingly, 33–1 mol. percent of a mixture of units (b), (c), (d) and (e),
   (5) polymer containing 67–99 mol. percent of units (a) and, correspondingly, 33–1 mol. percent of a mixture of units (b) and (d),
   (6) polymers containing 67–99 mol. percent of units (a) and, correspondingly, 33–1 mol. percent of a mixture of units (b) and (e),
   (7) polymers containing 67–99 mol. percent of units (a) and, correspondingly, 33–1 mol. percent of a mixture of units (b), (c) and (e),
   (8) polymers containing 67–99 mol. percent of units (a) and, correspondingly, 33–1 mol. percent of a mixture of units (b), (d), and (e), and
   (9) mixtures of (1), (2), (3), (4), (5), (6), (7), and (8), said units (a) having the structure $$-CH_2-CH_2-$$

said units (b) having the structure

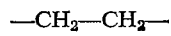

said units (c) having the structure

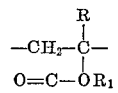

said units (d) having the structure

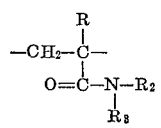

said units (e) having the structure

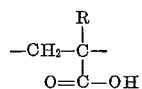

where R is selected from the group consisting of hydrogen and methyl, $R_1$ is the ammonium ion, $R_2$ and $R_3$ are independently selected from the group consisting of hydrogen, methyl, ethyl, propyl, butyl, hydroxyethyl, morpholine and heterocyclic groups containing up to 22 carbon atoms, and $R_4$ is selected from allyl and alkyl groups containing up to 22 carbon atoms said aqueous dispersion of said ethylene polymer having been prepared by passing an aqueous dispersion of a water-insoluble, self-emulsifiable ethylene polymer containing pendent metallic carboxylate groups through an ion exchange zone containing a strongly acidic cation exchange resin charged wtih ammonium ions, and recovering from said aqueous dispersion glass fibers coated with an ethylene polymer wherein said pendent ammonium salt groups have been converted to acid groups.

References Cited
UNITED STATES PATENTS 3,511,799   5/1970   Clampitt ---------- 260—29.6
3,486,929   12/1969  Anspon et al. ------ 117—138.8

RALPH S. KENDALL, Primary Examiner

U.S. Cl. X.R.

117—161 UZ